(12) United States Patent
Joo et al.

(10) Patent No.: US 10,457,538 B2
(45) Date of Patent: Oct. 29, 2019

(54) WATER DISCHARGE DEVICE

(71) Applicant: COWAY CO., LTD., Chungcheongnam-do (KR)

(72) Inventors: Woo-Jin Joo, Seoul (KR); Jung-Hwan Lee, Seoul (KR); Jong-Hwan Lee, Seoul (KR); Hyun-Soo Shin, Seoul (KR); Chul-Ho Kim, Seoul (KR)

(73) Assignee: Coway Co., Ltd (KR)

( * ) Notice: Subject to any disclaimer, the term of this patent is extended or adjusted under 35 U.S.C. 154(b) by 0 days.

(21) Appl. No.: 16/065,514

(22) PCT Filed: Dec. 20, 2016

(86) PCT No.: PCT/KR2016/014949
§ 371 (c)(1),
(2) Date: Jun. 22, 2018

(87) PCT Pub. No.: WO2017/111435
PCT Pub. Date: Jun. 29, 2017

(65) Prior Publication Data
US 2019/0002267 A1    Jan. 3, 2019

(30) Foreign Application Priority Data

Dec. 23, 2015 (KR) .................. 10-2015-0184630

(51) Int. Cl.
*B67D 1/14* (2006.01)
*B67D 3/00* (2006.01)
(52) U.S. Cl.
CPC ............. *B67D 1/14* (2013.01); *B67D 3/0058* (2013.01)
(58) Field of Classification Search
CPC .......... B67D 1/14; B67D 3/0058; B67D 3/04; B67D 3/043; F16K 31/602; F16K 31/607
(Continued)

(56) References Cited

U.S. PATENT DOCUMENTS 1,723,066 A * 8/1929 Ogden .................. B67D 3/043
                                                    251/215
2,235,990 A    5/1940 Guttery
(Continued)

FOREIGN PATENT DOCUMENTS

CN          104736448          6/2015
JP          41-24685           12/1966
(Continued)

OTHER PUBLICATIONS

PCT/ISA/210 Search Report issued on PCT/KR2016/014949 pp. 5.
(Continued)

*Primary Examiner* — Lien M Ngo
(74) *Attorney, Agent, or Firm* — The Farrell Law Firm, P.C.

(57) ABSTRACT

A water discharge device is disclosed. A water discharge device according to an embodiment of the present invention may comprise: a main body having a flow channel formed therein such that water flows through the same and having a discharge opening connected to the flow channel and to the outside such that the water, which has flowed through the flow channel, is discharged to the outside; an opening/closing portion comprising an opening/closing member movably provided in the flow channel so as to open/close an opening/closing hole formed in the flow channel; and a manipulation portion that comprises a rotatable member, which rotates, and interworks with the main body and the opening/closing portion such that the opening/closing member is moved in the flow channel by a rotation of the rotatable member.

17 Claims, 10 Drawing Sheets

(58) Field of Classification Search
USPC .................................................. 222/508–522
See application file for complete search history.

(56) References Cited

U.S. PATENT DOCUMENTS

| | | | |
|---|---|---|---|
| 6,311,948 B1 | 11/2001 | Weaver | |
| RE38,750 E * | 7/2005 | Weaver | F16K 31/566 137/454.6 |
| 2003/0001124 A1 * | 1/2003 | Chen | F16K 35/025 251/113 |
| 2004/0134941 A1 * | 7/2004 | Laible | B67D 7/0294 222/518 |
| 2008/0169440 A1 * | 7/2008 | Meyer | B67D 3/0058 251/95 |

FOREIGN PATENT DOCUMENTS

| | | |
|---|---|---|
| JP | 57-134463 | 8/1982 |
| JP | 60-194677 | 12/1985 |
| JP | 09020397 | 1/1997 |
| JP | 2006-234112 | 9/2006 |
| JP | 3134337 | 7/2007 |
| JP | 2013-067435 | 4/2013 |
| JP | 2015-017691 | 1/2015 |
| KR | 1020120140490 | 12/2012 |
| KR | 1020140073793 | 6/2014 |
| KR | 1020140087349 | 7/2014 |
| WO | WO 2014/032208 | 3/2014 |

OTHER PUBLICATIONS

PCT/ISA/237 Written Opinion issued on PCT/KR2016/014949 pp. 8.

Japanese Office Action dated Apr. 17, 2019 issued in counterpart application No. 2018-533635, 4 pages.

Chinese Office Action dated May 13, 2019 issued in counterpart application No. 201680076247.9, 6 pages.

* cited by examiner

[Figure 1]
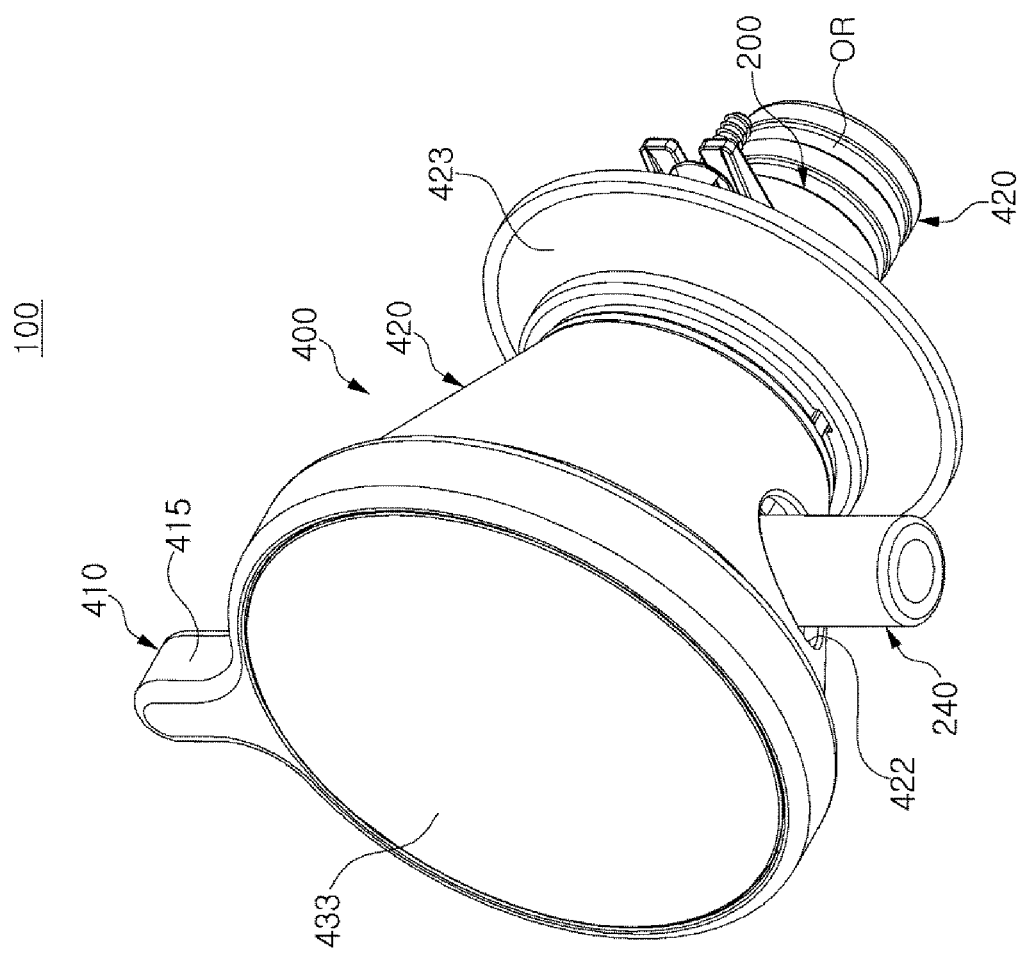

【Figure 2】
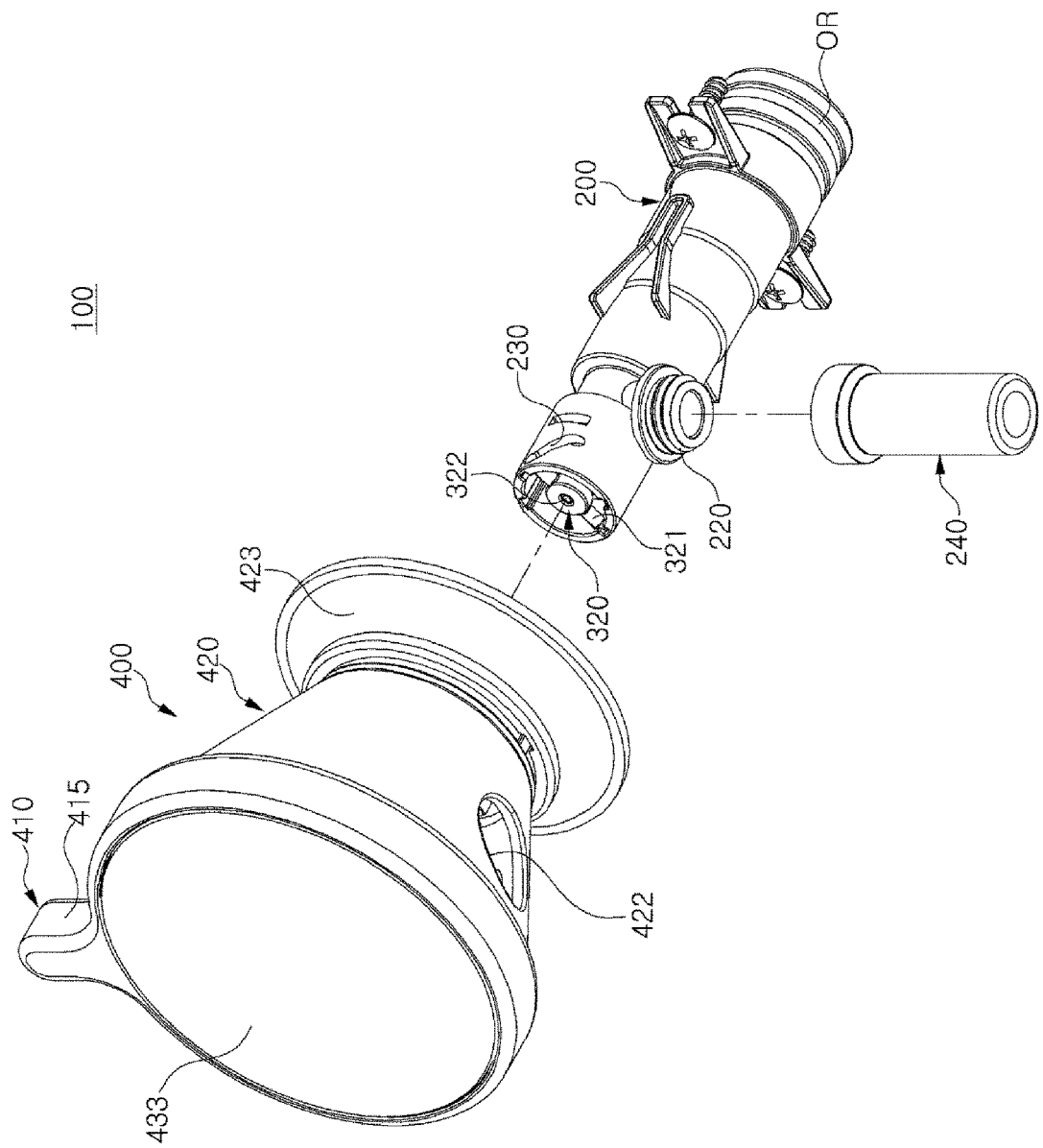

【Figure 3】
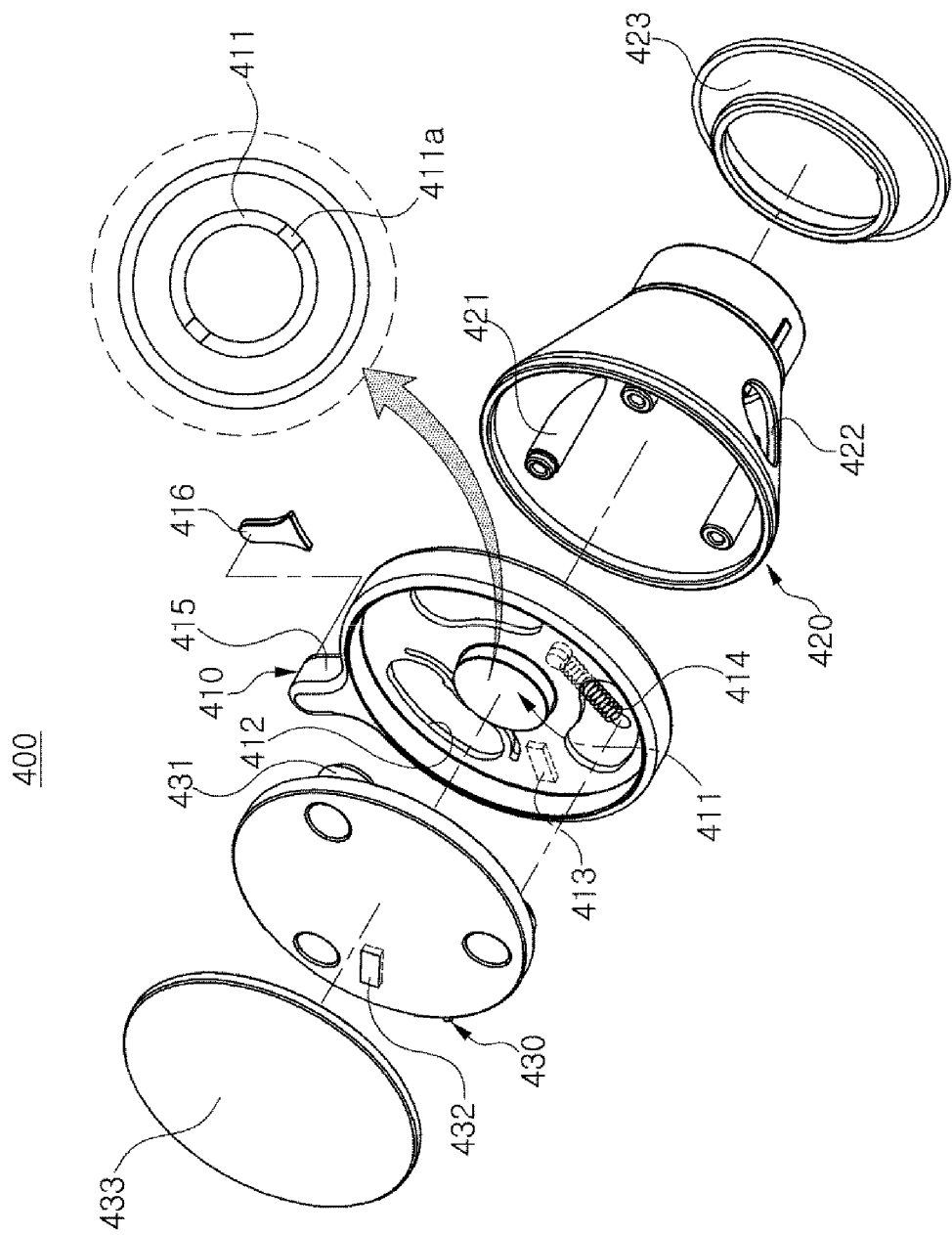

[Figure 4]
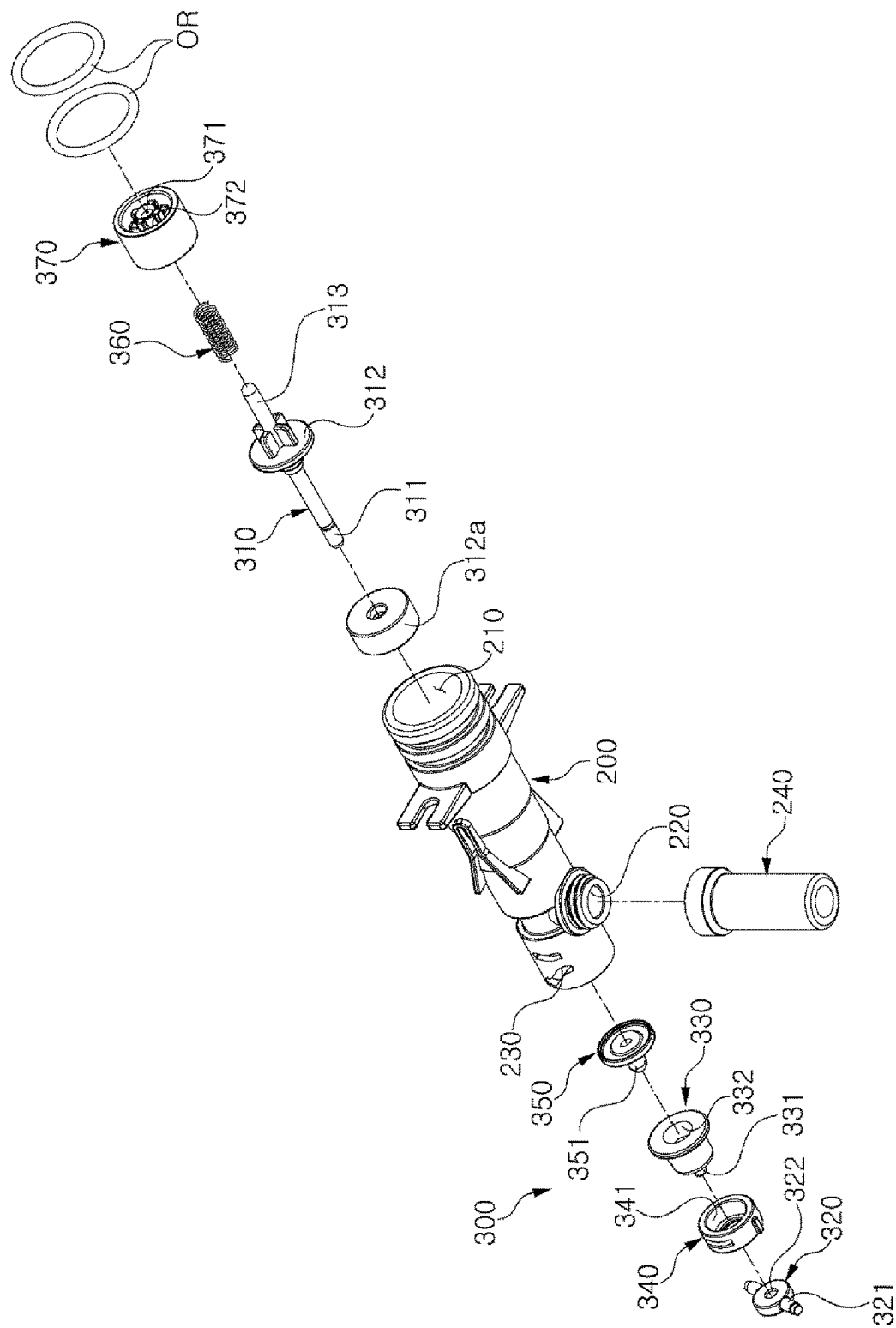

[Figure 5]
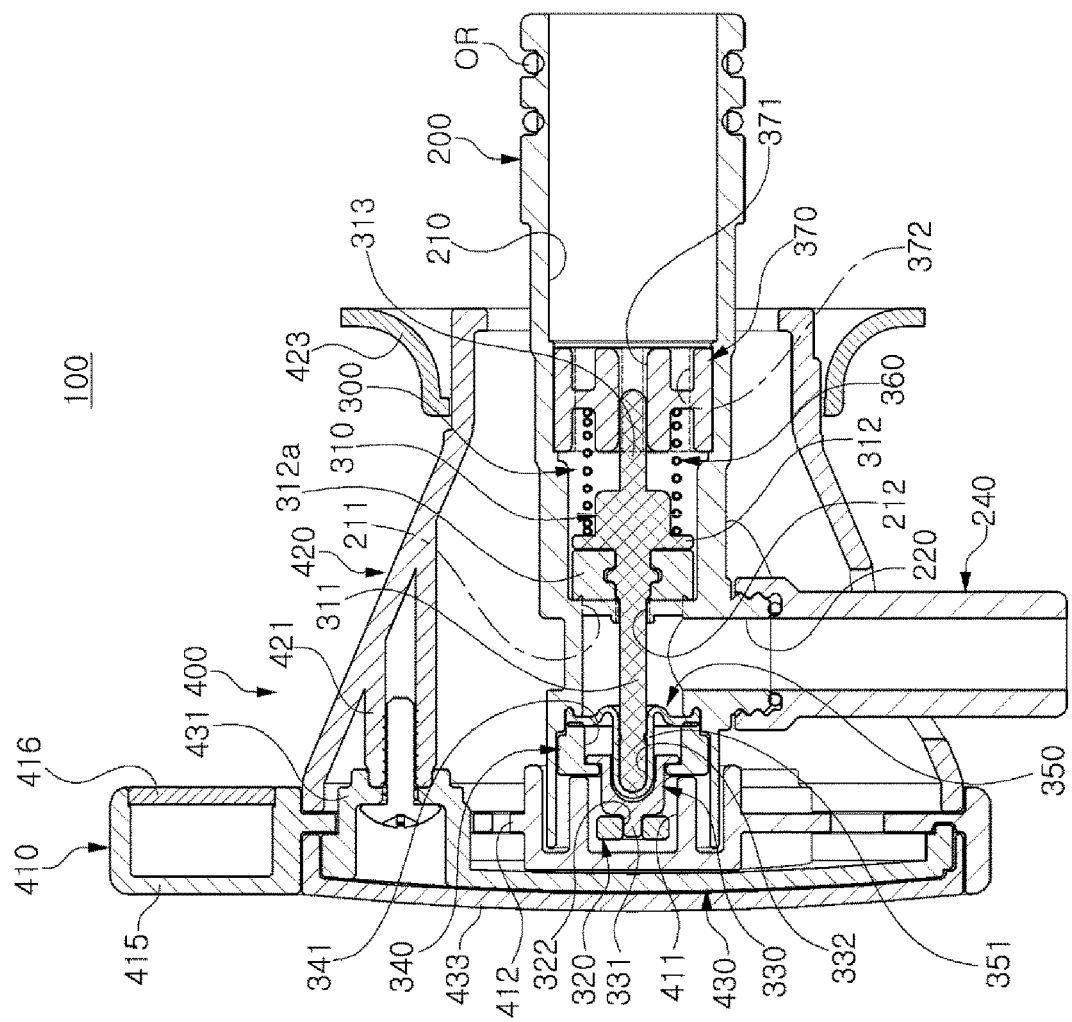

【Figure 6】
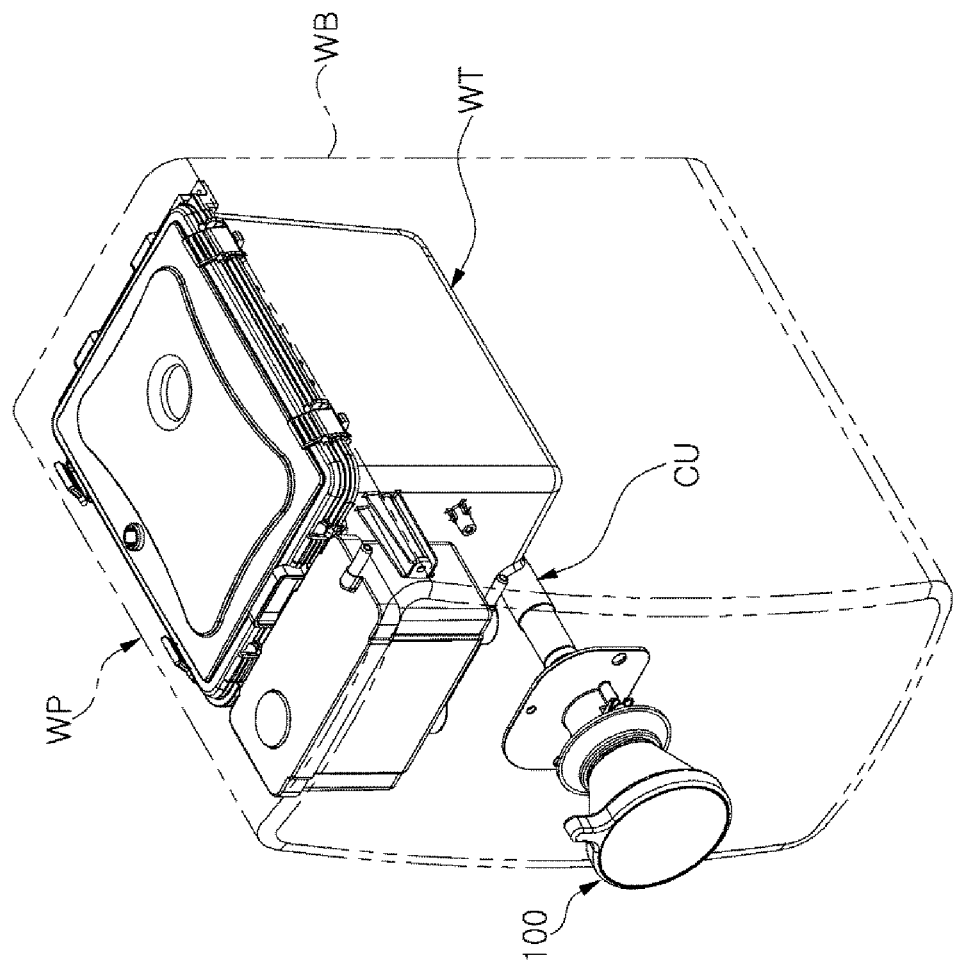

【Figure 7】
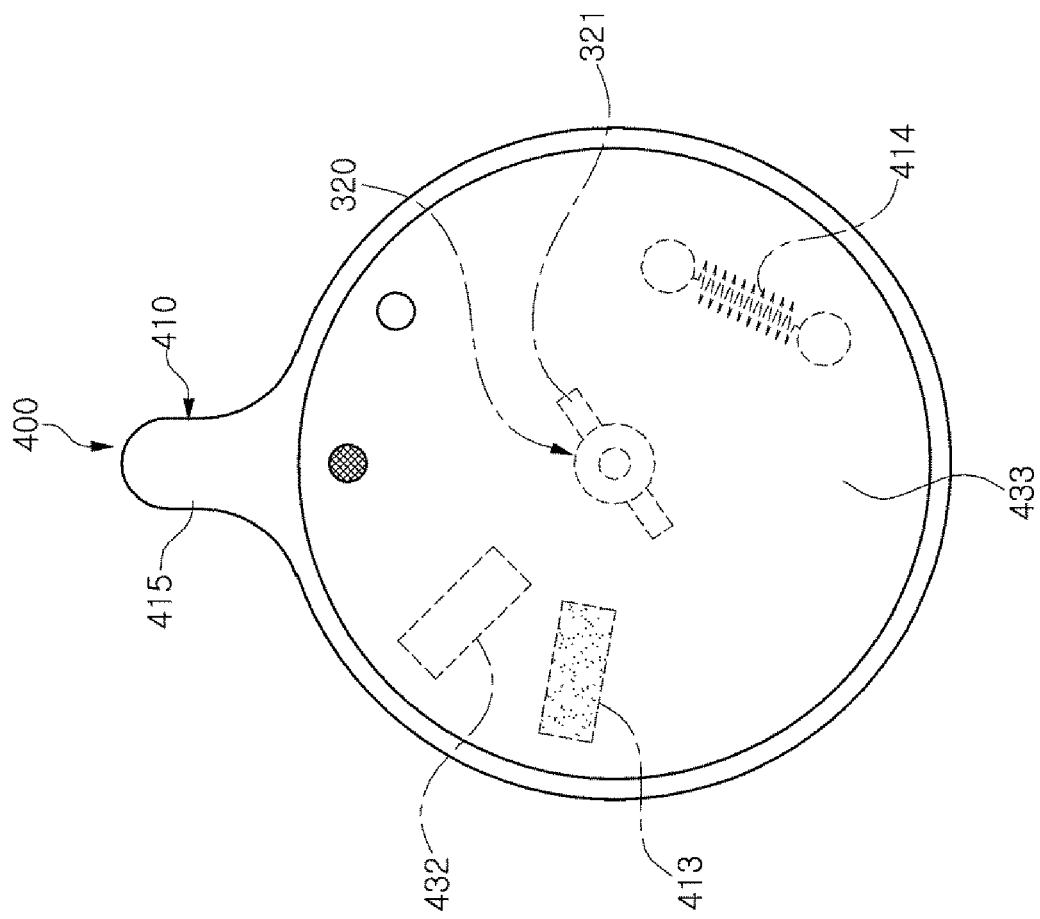

[Figure 8]
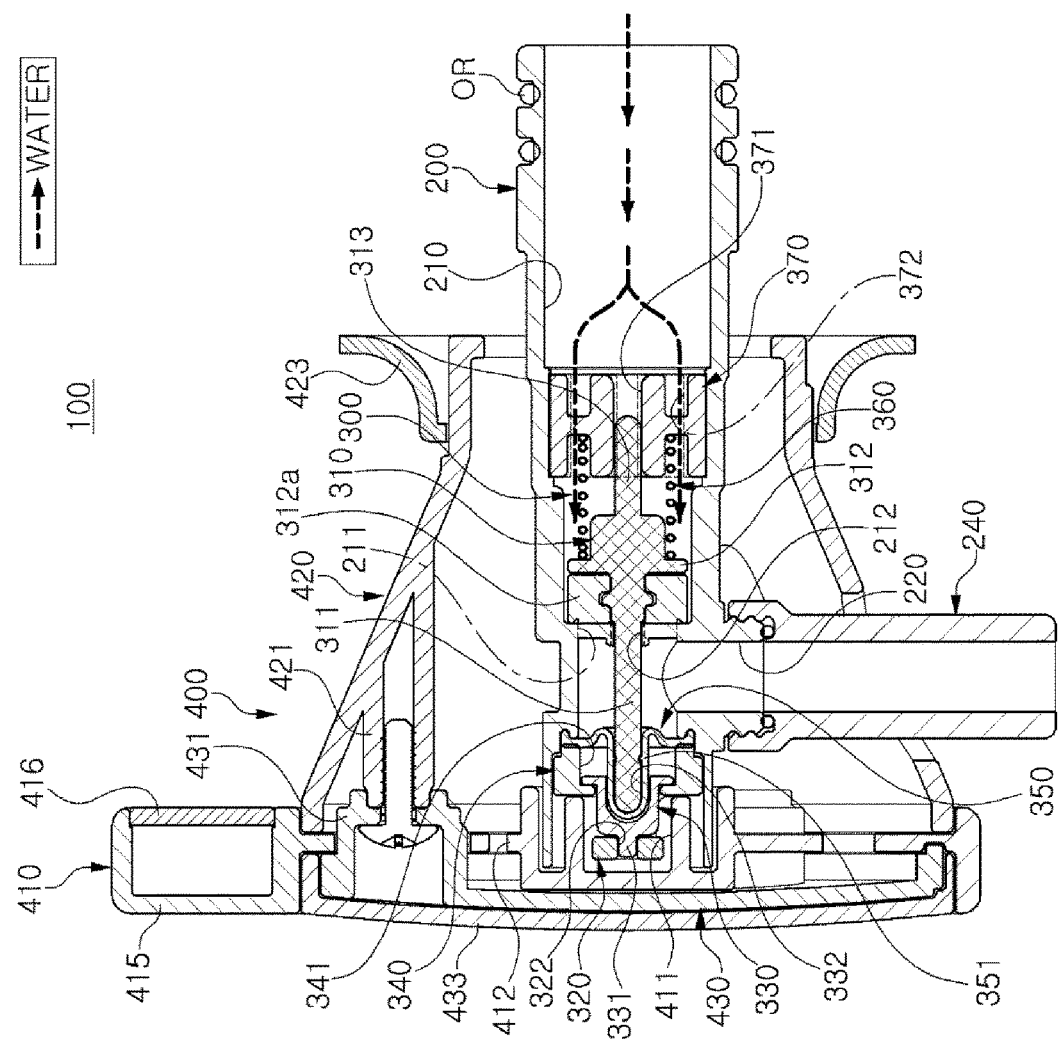

[Figure 9]
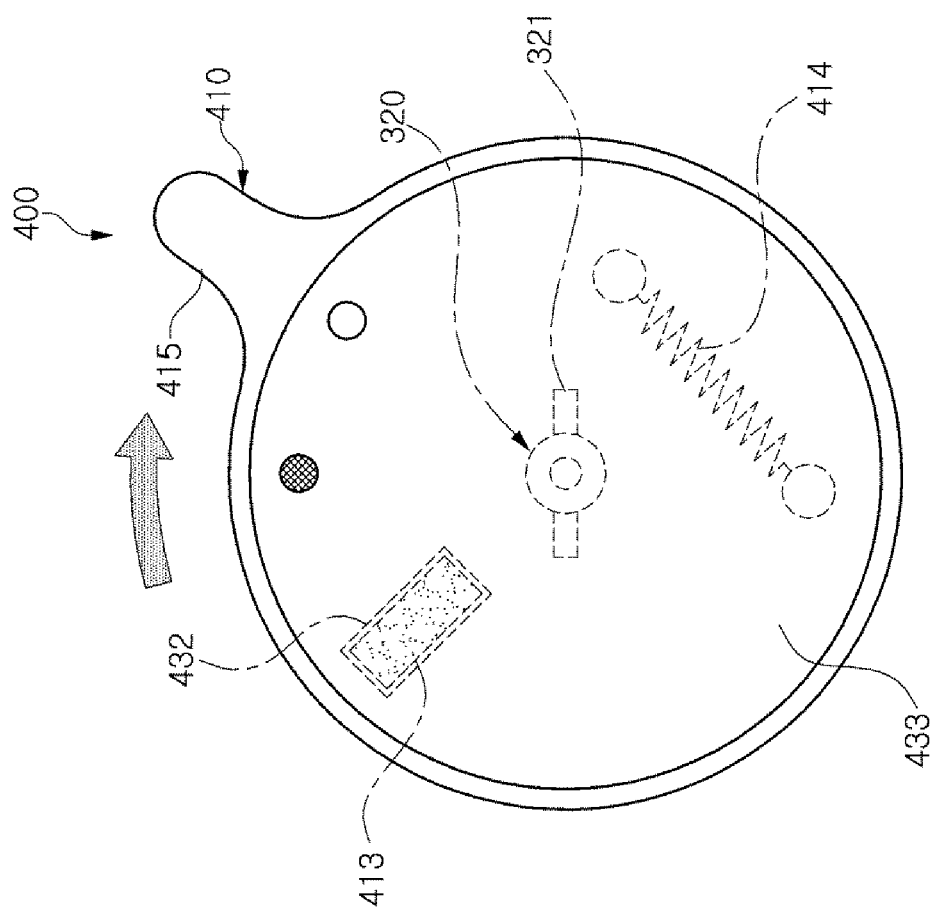

【Figure 10】
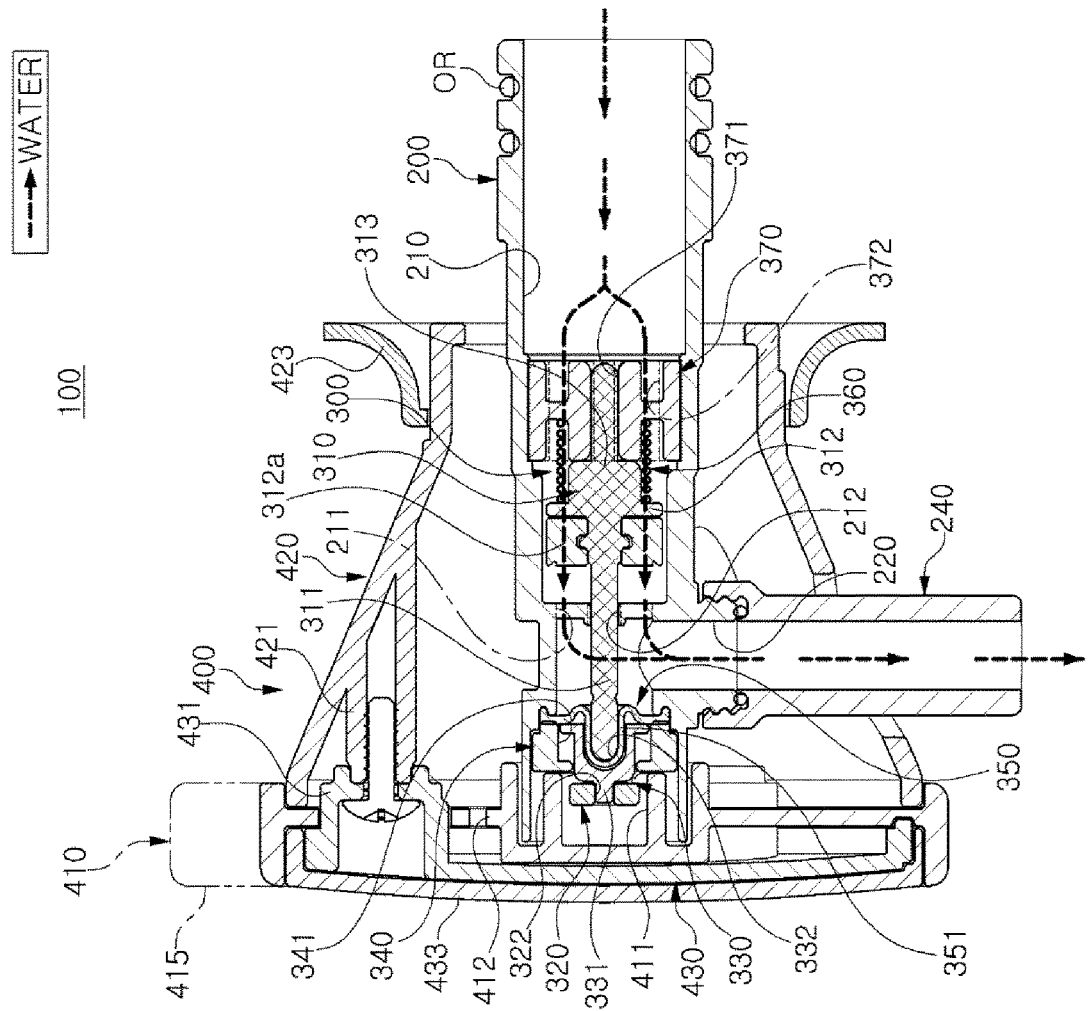

WATER DISCHARGE DEVICE

PRIORITY

This application is a National Phase Entry of International Application No. PCT/KR2016/014949, which was filed on Dec. 20, 2016, and claims priority to Korean Patent Application No. 10-2015-0184630, which was filed on Dec. 23, 2015, the content of each of which is incorporated herein by reference.

TECHNICAL FIELD

The present disclosure relates to a water discharge device connected to a water source to discharge water outwardly from the water source and supply water to a user.

BACKGROUND ART

A water discharge device is connected to a water source and discharges water to the outside from the water source to supply the water to the user.

A related art water discharge device is provided with a flow channel through which water supplied from a water source flows, and an opening and closing member is movably provided in the flow channel. The flow channel is opened and closed according to movement of the opening and closing member by turning a lever member.

In such a water discharge device, since water is discharged from the water discharge device only when a user pushes the lever member to turn the lever member in a state of holding a water cup, or the like, which may be inconvenient.

DISCLOSURE

Technical Problem

The present disclosure is made upon recognition of at least any one of requests or problems that arise in the related art described above.

An aspect of the present disclosure is to discharge water, which has been supplied from a water source to a water discharge device, conveniently to the outside from the water discharge device.

An aspect of the present disclosure is to allow an opening and closing member to move in a flow channel formed to allow water to flow therethrough in a water discharge device, to open and close an opening and closing hole formed in the flow channel according to rotation of a rotary member.

Technical Solution

According to an aspect of the present disclosure, the water discharge device may have the following features.

The water discharge device according to an exemplary embodiment in the present disclosure may include: a main body including a flow channel in which water flows and an outlet connected to the flow channel and the outside to allow water flowing in the flow channel to be discharged to the outside; an opening and closing part including an opening and closing member movably provided in the flow channel to open and close an opening and closing hole formed in the flow channel; and an operating part including a rotating rotary member and enabling the opening and closing member to move in the flow channel according to rotation of the rotary member in conjunction with the main body and the opening and closing part.

In this case, the opening and closing part may include a movement switching member to which a connection part included in the opening and closing member is connected, the movement switching member moving in a length direction of the flow channel, while rotating according to rotation of the rotary member.

Also, the movement switching member may have a guide protrusion inserted into a guide hole formed in the main body to move and rotate, along the guide hole.

Also, the rotary member may have an insertion part into which the movement switching member is movably inserted.

Also, the insertion part may have a guide recess guiding movement of the guide protrusion.

Also, the movement switching member may have a connection hole connected to the connection part.

Also, the opening and closing part may have a connection member having one side connected to the connection hole and the other side to which the connection part is connected.

Also, a fitting protrusion fitted into the connection hole may be formed on one side of the connection member and a fitting recess into which the connection part is fitted may be formed on the other side of the connection member.

Also, the opening and closing part may further include a member support member provided in the main body and movably supporting the connection member.

Also, the member support member may have a movement support hole into and by which the other side of the connection member is movably inserted and supported.

Also, the opening and closing part may further include a flow channel sealing member provided between the member support member and the main body to seal one open side of the flow channel.

Also, the flow channel sealing member may have a fitting part into which the connection part is fitted, and fitted into the fitting recess formed in the connection member together with the connection part.

Also, a hole opening and closing part included in the opening and closing member to open and close the opening and closing hole may have a hole sealing member.

Also, the opening and closing part may further include a first elastic member elastically supporting the opening and closing member.

Also, the opening and closing part may further include a support member provided in the flow channel, having a movable movement guide part included in the opening and closing member, and supporting the first elastic member.

Also, the support member may have a movement guide hole into which the movement guide part is movably inserted and a water passing hole allowing water to pass therethrough.

Also, the operating part may further include an operating part body into which one side of the main body is inserted and an operating part lid covering one open side of the operating part body.

Also, the rotary member may be rotatably provided between the operating part body and the operating part lid.

Also, a first magnet may be provided in the rotary member, and a second magnet may be provided in a position of the operating part cover corresponding to a position of the first magnet at a rotation position of the rotary member at which the opening and closing member opens the opening and closing hole.

Also, the operating part body may have a first coupling part and the operating part lid may have a second coupling part to which the first coupling part is coupled.

Also, the rotary member may have a coupling part passing hole through which the first coupling part or the second coupling part passes.

Also, a second elastic member may be connected to the rotary member, and the second elastic member may be connected to the first coupling part or the second coupling part through the coupling part passing hole.

Advantageous Effects

As described above, according to the exemplary embodiment in the present disclosure, the opening and closing member may move in the flow channel formed in the water discharge device to allow water to flow therein, to open and close the opening and closing hole formed in the flow channel.

Also, according to the exemplary embodiment in the present disclosure, water supplied from a water source to the water discharge device may be conveniently discharged from the water discharge device to the outside.

DESCRIPTION OF DRAWINGS

FIG. 1 is a perspective view of an exemplary embodiment of a water discharge device according to the present disclosure.

FIG. 2 is a view illustrating that an operating part of an exemplary embodiment of a water discharge device according to the present disclosure is separated from a main body and an opening and closing part.

FIG. 3 is an exploded perspective view of an operating part of an exemplary embodiment of a water discharge device according to the present disclosure.

FIG. 4 is an exploded perspective view of a main body and an opening and closing part of an exemplary embodiment of the water discharge device according to the present disclosure.

FIG. 5 is a cross-sectional view taken along line I-I' in FIG. 1.

FIG. 6 is a view illustrating that a water discharge device according to an exemplary embodiment in the present disclosure is installed in a water purifier body of a water purifier and connected to a purified water tank provided in the water purifier.

FIGS. 7 to 10 are views illustrating an operation of an exemplary embodiment of a water discharge device according to the present disclosure, in which FIGS. 7 and 8 illustrate that a rotary member of an operating part rotates so that an opening and closing member of an opening and closing part closes an opening and closing hole of a main body, and FIGS. 9 and 10 illustrate that the rotary member of the operating part rotates so that the opening and closing member of the opening and closing part opens the opening and closing hole of the main body.

MODE FOR INVENTION

In order to facilitate understanding of the features of the present disclosure as described above, a water discharge device according to an exemplary embodiment in the present disclosure will be described in detail.

The exemplary embodiments most appropriate to help understand the technical features of the present disclosure will be described, and the technical features of the present disclosure are not limited by the described exemplary embodiments and merely illustrate the implementation of the present disclosure through the exemplary embodiments described hereinafter. Thus, the present disclosure may be variably modified within the scope of the present disclosure through the exemplary embodiments described below, and such modifications are within the scope of the present disclosure. In order to help understand the exemplary embodiments described hereinafter, the like or similar reference numerals are used for relevant components among the components having the same function in the respective exemplary embodiments in the accompanying drawings.

Hereinafter, an exemplary embodiment of the water discharge device according to the present disclosure will be described with reference to FIGS. 1 to 10.

FIG. 1 is a perspective view of an exemplary embodiment of a water discharge device according to the present disclosure, and FIG. 2 is a view illustrating that an operating part of an exemplary embodiment of a water discharge device according to the present disclosure is separated from a main body and an opening and closing part.

Also, FIG. 3 is an exploded perspective view of an operating part of an exemplary embodiment of a water discharge device according to the present disclosure, and FIG. 4 is an exploded perspective view of a main body and an opening and closing part of an exemplary embodiment of the water discharge device according to the present disclosure.

Also, FIG. 5 is a cross-sectional view taken along line I-I' in FIG. 1, and FIG. 6 is a view illustrating that a water discharge device according to an exemplary embodiment in the present disclosure is installed in a water purifier body of a water purifier and connected to a purified water tank provided in the water purifier.

Also, FIGS. 7 to 10 are views illustrating an operation of an exemplary embodiment of a water discharge device according to the present disclosure, in which FIGS. 7 and 8 illustrate that a rotary member of an operating part rotates so that an opening and closing member of an opening and closing part closes an opening and closing hole of a main body, and FIGS. 9 and 10 illustrate that the rotary member of the operating part rotates so that the opening and closing member of the opening and closing part opens the opening and closing hole of the main body.

A water discharge device 100 according to the present disclosure may include a main body 200, an opening and closing part 300, and an operating part 400, as illustrated in FIGS. 1 to 5.

Main Body

As illustrated in FIG. 5, a flow channel 210 may be formed in the main body 200. The flow channel 210 may be connected to a water source. As illustrated in FIGS. 8 and 10, water from the water source may flow into the flow channel 210 and flow therein.

As illustrated in FIG. 6, the water source connected to the flow channel 210 may be a purified water tank WT provided in a water purifier WP and storing purified water filtered by a water filter (not shown).

As illustrated in FIG. 6, the main body 200 may be connected to the purified water tank WT by a separate connection unit CU so that the flow channel 210 may be connected to the purified water tank WT. In this case, the main body 200 may include a connection sealing member OR to prevent leakage of water through a connection portion between the main body 200 and the connection unit CU.

The water source connected to the flow channel 210 is not limited to the above-described purified water tank WT, and any known water source such as a water filter, or the like, provided to filter water introduced to a water purifier WP may be used as long as it is able to supply water to the flow channel 210.

The flow channel 210 may be formed to penetrate through the main body 200. One open side of the flow channel 210 is sealed by a flow channel sealing member 350 included in the opening and closing part 300 as described later and as illustrated in FIG. 5 and the other open side may be connected to the water source as described above.

An opening and closing hole 211 may be formed in the flow channel 210. The opening and closing hole 211 may be opened and closed as illustrated in FIGS. 8 and 10 according to movement of the opening and closing member 310, which will be described later, included in the opening and closing part 300.

The flow channel 210 may have a connection part passing hole 212 in addition to the opening and closing hole 211 described above. As illustrated in FIG. 5, a connection part 311 included in the opening and closing member 310 may pass through the connection part passing hole 212 and be supported by the connection part passing hole 212.

The connection part passing hole 212 may be formed in the center of the flow channel 210 and a plurality of, for example, four, opening and closing holes 211 may be formed around the connection part passing hole 212.

However, a shape and a position of the opening and closing hole 211 and the connection part passing hole 212 are not limited and the opening and closing hole 211 and the connection part passing hole 212 may have any shape or may be formed in any position of the flow channel 210.

The main body 200 may have an outlet 220 in addition to the flow channel 210 described above. The outlet 220 may be connected to the flow channel 210 and the outside.

When the opening and closing hole 211 is closed according to movement of the opening and closing member 310 of the aforementioned opening and closing part 300 as illustrated in FIG. 8, water introduced into the flow channel 210 may not flow to the outlet 220.

However, when the opening and closing hole 211 is opened according to movement of the opening and closing member 310 of the opening and closing part 300 as illustrated in FIG. 10, water introduced to the flow channel 210 may flow to the outlet 220 so as to be discharged to the outside and supplied to the user.

As illustrated in FIG. 5, a discharge guide member 240 may be connected to the outlet 220. Water may be discharged to the outside through the outlet 220 and the discharge guide member 240, and supplied to the user.

The main body 200 may have a guide hole 230 as illustrated in FIG. 4. A guide protrusion 321 formed in a movement switching member 320, which will be described later, included in the opening and closing part 300 may be inserted into the guide hole 230.

When the movement switching member 320 rotates together with a rotary member 410, which will be described later, included in the operating part 400 in accordance with rotation of the rotary member 410, a guide protrusion 321 of the movement switching member 320 may move along a guide hole 230 and the movement switching member 320 may rotate to move in a length direction of the flow channel 210.

The guide hole 230 may be formed at an outer circumference of one side of the main body 200 and sloped in a length direction of the main body 200.

However, a position and a shape of the guide hole 230 in the main body 200 are not limited and the guide hole 230 may have any position and shape as long as the guide protrusion 321 of the movement switching member 320 may be inserted into the guide hole 230 and the movement switching member 320 may rotate to move in a length direction of the flow channel 210 according to rotation of the rotary member 410 of the operating part 400.

Opening and Closing Part

The opening and closing part 300 may include an opening and closing member 310. The opening and closing member 310 may be movably provided in the flow channel 210 of the main body 200 to open and close the opening and closing hole 211 formed in the flow channel 210.

As illustrated in FIG. 4, the opening and closing member 310 may include a connection part 311, a hole opening and closing part 312, and a movement guide part 313.

The connection part 311 of the opening and closing member 310 may be fitted into a fitting part 351 formed in a flow channel sealing member 350 to be described later. The connection part 311 may be fitted into a fitting recess 332 formed in a connection member 330 to be described later, together with the fitting part 351 of the flow channel sealing member 350.

The connection part 311 of the opening and closing member 310 may be fitted into the fitting recess 332 of the connection member 330 together with the fitting part 351 of the flow channel sealing member 350 through a connection part passing hole 212 formed in a flow channel 210 of the main body 200 described above as illustrated in FIG. 5.

The hole opening and closing part 312 of the opening and closing member 310 may open and close the opening and closing hole 211. To this end, the hole opening and closing part 312 may be provided with a hole sealing member 312a as illustrated in FIGS. 4 and 5. However, a configuration of the hole opening and closing part 312 is not limited, and any known configuration may be used as long as it can open and close the opening and closing hole 211.

The hole opening and closing part 312 of the opening and closing member 310 may be elastically supported by a first elastic member 360 to be described later, as illustrated in FIGS. 4 and 5.

The movement guide part 313 of the opening and closing member 310 may be movably provided in a support member 370, which will be described later, illustrated in FIGS. 4 and 5 and provided in the flow channel 210 of the main body 200. For example, the movement guide part 313 of the opening and closing member 310 may be movably inserted into a movement guide hole 371 formed in the support member 370 and movably supported.

The opening and closing part 300 may further include the movement switching member 320. The connection part 311 of the opening and closing member 310 may be connected to the movement switching member 320. The movement switching member 320 may move in the length direction of the flow channel 210 of the main body 200, while rotating according to rotation of the rotary member 410 of the operating part 400.

Rotation movement of the rotary member 410 of the operating part 400 may be switched to movement of the opening and closing member 310 of the opening and closing part 300 on the flow channel 210 of the main body 200, and the closing member 310 may open and close the opening and closing hole 211 of the flow channel 210 of the main body 200.

As illustrated in FIG. 4, a guide protrusion 321 may be provided in the movement switching member 320. The guide protrusion 321 may be inserted into the guide hole 230 of the main body 200 described above.

When the movement switching member 320 rotates in accordance with rotation of the rotary member 410 of the operating part 400, the guide protrusion 321 of the movement switching member 320 may move in the length direction of the flow channel 210 and rotate, along the guide hole 230 of the main body 200.

The movement switching member 320 may have a connection hole 322 formed therein. The movement switching member 320 may be connected to the connection part 311 of the opening and closing member 310 through the connection hole 322.

The opening and closing part 300 may further include the connection member 330.

One side of the connection member 330 may be connected to the connection hole 322 of the movement switching member 320 described above. For example, as illustrated in FIGS. 4 and 5, a fitting protrusion 331 is formed on one side of the connection member 330 and the fitting protrusion 331 is fitted to the connection hole 322 of the movement switching member 320, whereby one side of the connection member 330 may be connected to the connection hole 322 of the movement switching member 320.

The connection part 311 of the opening and closing member 310 may be connected to the other side of the connection member 330. For example, as illustrated in FIGS. 4 and 5, a fitting recess 332 may be formed on the other side of the connection member 330 and the connection part 311 of the opening and closing member 310 may be fitted to the fitting recess 332 of the connection member 330 together with the fitting part 351 of the flow channel sealing member 350, whereby the connection part 311 of the opening and closing member 310 may be connected to the other side of the connection member 330.

The opening and closing part 300 may further include a member support member 340. As illustrated in FIG. 5, the member support member 340 may be provided in the main body 200. The member support member 340 may movably support the connection member 330 described above.

For example, the member support member 340 may have a movement support hole 341, and the other side of the connection member 330 may be movably inserted into and supported by the movement support hole 341.

The opening and closing part 300 may further include the flow channel sealing member 350. The flow channel sealing member 350 may be provided between the member support member 340 and the main body 200 to seal one open side of the flow channel 210 of the main body 200.

Accordingly, water flowing in the flow channel 210 may not be discharged through one open side of the flow channel 210.

As illustrated in FIGS. 4 and 5, the fitting part 351 may be formed on the flow channel sealing member 350. The connection part 311 of the opening and closing member 310 may be fitted into the fitting part 351. With the connection part 311 of the opening and closing member 310 fitted in the fitting part 351, the fitting part 351 may be fitted into the fitting recess 332 of the connection member 330 together with the connection part 311.

The opening and closing part 300 may further include a first elastic member 360. The first elastic member 360 may elastically support the opening and closing member 310. For example, the first elastic member 360 may elastically support the hole opening and closing part 312 of the opening and closing member 310 as illustrated in FIG. 5.

When the opening and closing member 310 moves in one direction along the flow channel 210 of the main body according to rotation and movement of the movement switching member 320 in one direction due to rotation of the rotary member 410 of the operating part 400 in one direction, to open the opening and closing hole 211 formed in the flow channel 210, the first elastic member 360 may be compressed as illustrated in FIG. 10.

In this state, when the external force for rotating or stopping the rotary member 410 is removed, the opening and closing member 310 may be moved along the flow channel 210 by the elastic force of the first elastic member 360 in the other direction opposite to the direction mentioned above to close the opening and closing hole 211 as illustrated in FIG. 8.

The rotary member 410 may rotate in the other direction according to movement and rotation of the movement switching member 320 in the other direction due to movement of the opening and closing member 310 in the other direction to close the opening and closing hole 211 described above.

The opening and closing part 300 may further include the support member 370. The support member 370 may be provided in the flow channel 210 as illustrated in FIG. 5. The support member 370 may be provided so that the movement guide part 313 of the opening and closing member 310 is movable.

To this end, the support member 370 may have the movement guide hole 371 into which the movement guide part 313 is movably inserted.

In addition, the support member 370 may have a water passing hole 372. Through the water passing hole 372, water may pass through the support member 370 and flow in the flow channel 210 of the main body 200.

The support member 370 may support the first elastic member 360 described above.

Operating Part

The operating part 400 may include the rotating rotary member 410 as illustrated in FIG. 3. The opening and closing member 310 of the opening and closing part 300 may move in the flow channel 210 of the main body 200 according to rotation of the rotary member 410 in conjunction with the main body 200 and the opening and closing part 300.

Accordingly, as illustrated in FIGS. 7 to 10, the opening and closing member 310 may open and close the opening and closing hole 211 of the flow channel 210 according to rotation of the rotary member 410.

Therefore, water supplied from the water source to the water discharge device 100, that is, water supplied to the flow channel 210 of the water discharge device 100, may be conveniently discharged from the water discharge device 100 to the outside.

The rotary member 410 may be rotatably provided between an operating part body 420 and an operating part lid 430, which will be described later. However, the configuration in which the rotary member 410 rotates is not limited, and any well-known configuration may be possible.

A handle 415 may be formed on the rotary member 410 as illustrated in FIG. 3. Thus, a user may hold the handle 415 and rotate the rotary member 410. An open side of the handle 415 may be covered by a handle cover 416 as illustrated in FIG. 3.

The rotary member 410 may rotate between a closing position as illustrated in FIG. 7 in which the opening and closing member 310 closes the opening and closing hole 211 of the flow channel 210 of the main body 200 as illustrated in FIG. 8 and an opening position as illustrated in FIG. 9 in which the opening and closing member 310 opens the opening and closing holes 211 as illustrated in FIG. 10.

The rotary member 410 may have an insertion part 411 formed therein. The movement switching member 320 of the opening and closing part 300 described above may be movably inserted into the insertion part 411.

Accordingly, the movement switching member 320 may rotate together with the rotary member 410 in accordance with rotation of the rotary member 410.

In this manner, when the movement switching member 320 rotates together with the rotary member 410, the guide protrusion 321 of the movement switching member 320 moves and rotates, along the guide hole 230 of the main body 200.

Also, the movement switching member 320 moves within the insertion part 411 of the rotary member 410, while rotating together with the rotary member 410.

To this end, a guide recess 411a for guiding movement of the guide protrusion 321 of the movement switching member 320 may be formed in the insertion part 411 as illustrated in FIG. 3.

The rotary member 410 may have a coupling part passing hole 412 as illustrated in FIG. 3. A first coupling part 421 (to be described later) formed on the operating part body 420 or a second coupling part 431 (to be described later) formed in the operating part lid 430 and coupled to the first coupling part 421 may pass through the coupling part passing hole 412.

The rotary member 410 may have a first magnet 413 as illustrated in FIG. 3. Also, a second magnet 432 may be provided in a rotational position of the rotary member 410 at which the opening and closing member 310 of the opening and closing part 300 opens the opening and closing hole 211 of the flow channel 210 of the main body 200, that is, in a position of the operating part lid 430 corresponding to a position of the first magnet 413 in the opening position of the rotary member 410 as illustrated in FIG. 3.

Accordingly, the rotary member 410 may be fixed to the opening position as illustrated in FIG. 9 by a magnetic force of the first magnet 413 and the second magnet 432.

When the user rotates the rotary member 410 by a predetermined angle to a position in which the magnetic forces of the first magnet 413 and the second magnet 432 are smaller than an elastic force of the first elastic member 360, for example, the rotary member 410 may be rotated to the closing position by the elastic force of the first elastic member 360, or the like.

A second elastic member 414 may be connected to the rotary member 410 as illustrated in FIG. 3. Also, the second elastic member 414 may be connected to the first coupling part 421 of the operating part body 420 or the second coupling part 431 of the operating part lid 430 through the coupling part passing hole 412 described above.

Accordingly, when the rotary member 410 is rotated to the opening position, the second elastic member 414 is stretched so that the elastic force of the second elastic member 414 may act on the rotary member 410 as illustrated in FIG. 9.

In this state, as described above, when the user rotates the rotary member 410 by a predetermined angle to a position in which the magnetic forces of the first magnet 413 and the second magnet 432 are smaller than the sum of the elastic forces of the first elastic member 360 and the second elastic member 414, the rotary member 410 may be rotated to the closing position by the elastic forces of the first elastic member 360 and the second elastic member 414.

The operating part 400 may further include the operating part body 420 and the operating part lid 430. One side of the main body 200 may be inserted into the operating part body 420. Further, the operating part lid 430 may cover one open side of the operating part body 420 that is open.

The first coupling part 421 may be formed on the operating part body 420. In addition, the second coupling part 431 may be formed on the operating part lid 430. The operating part body 420 and the operating part lid 430 may be coupled as the first coupling part 421 of the operating part body 420 and the second coupling part 431 of the operating part lid 430 are coupled by a bolt, or the like.

Three first coupling parts 421 may be formed in the operating part body 420 and three second coupling parts 431 may be formed in the operating part lid 430 to correspond to the three first coupling parts 421. The rotary member 410 may have three coupling part passing holes 412.

However, the number of the first coupling parts 421 and the second coupling parts 431 and the coupling part passing holes 412 corresponding to the first coupling part 421 is not limited, and any number may be possible.

The operation member body 420 may have a guide member passing hole 422 through which the discharge guide member 240 passes. Also, the operating part body 420 may have a mounting assisting member 423 for assisting the operating part body 420 to be provided in the water purifier body WB of the water purifier WP.

The operating part lid 430 may have an outer lid 433.

As described above, when the water discharge device according to the present disclosure is used, the opening and closing member may move in the flow channel formed in the water discharge device to allow water to flow therein, to open and close the opening and closing hole formed in the flow channel, and water supplied from a water source to the water discharge device may be conveniently discharged from the water discharge device to the outside.

In the water discharge device described above, the configuration of the exemplary embodiments described above is not limited in its application, but all or some of the exemplary embodiments may be selectively combined to be configured to make various modifications.

The invention claimed is:
1. A water discharge device comprising:
a main body including a flow channel in which water flows and an outlet connected to the flow channel and the outside to allow water flowing in the flow channel to be discharged to the outside;
an opening and closing part including an opening and closing member movably provided in the flow channel to open and close an opening and closing hole formed in the flow channel; and
an operating part including a rotating rotary member and enabling the opening and closing member to move in the flow channel according to rotation of the rotary member in conjunction with the main body and the opening and closing part,
wherein the opening and closing part includes a movement switching member to which a connection part included in the opening and closing member is connected, the movement switching member moving in a length direction of the flow channel, while rotating according to rotation of the rotary member, and
wherein the movement switching member has a guide protrusion inserted into a guide hole formed in the main body to move and rotate, along the guide hole.
2. The water discharge device of claim 1, wherein the rotary member has an insertion part into which the movement switching member is movably inserted.

3. The water discharge device of claim 1, wherein the movement switching member has a connection hole connected to the connection part.

4. The water discharge device of claim 3, wherein the opening and closing part has a connection member having one side connected to the connection hole and the other side to which the connection part is connected.

5. The water discharge device of claim 4, wherein a fitting protrusion fitted into the connection hole is formed on one side of the connection member and a fitting recess into which the connection part is fitted is formed on the other side of the connection member.

6. The water discharge device of claim 4, wherein the opening and closing part further includes a member support member provided in the main body and movably supporting the connection member.

7. The water discharge device of claim 6, wherein the member support member has a movement support hole into and by which the other side of the connection member is movably inserted and supported.

8. The water discharge device of claim 6, wherein the opening and closing part further includes a flow channel sealing member provided between the member support member and the main body to seal one open side of the flow channel.

9. The water discharge device of claim 8, wherein the flow channel sealing member has a fitting part into which the connection part is fitted, and fitted into the fitting recess formed in the connection member together with the connection part.

10. A water discharge device comprising:
a main body including a flow channel in which water flows and an outlet connected to the flow channel and the outside to allow water flowing in the flow channel to be discharged to the outside;
an opening and closing part including an opening and closing member movably provided in the flow channel to open and close an opening and closing hole formed in the flow channel; and
an operating part including a rotating rotary member and enabling the opening and closing member to move in the flow channel according to rotation of the rotary member in conjunction with the main body and the opening and closing part,
wherein the opening and closing part includes a movement switching member to which a connection part included in the opening and closing member is connected, the movement switching member moving in a length direction of the flow channel, while rotating according to rotation of the rotary member,
wherein the opening and closing part further includes a first elastic member elastically supporting the opening and closing member, and
wherein the operating part further includes an operating part body into which one side of the main body is inserted and an operating part lid covering one open side of the operating part body.

11. The water discharge device of claim 10, wherein the opening and closing part further includes a support member provided in the flow channel, having a movable movement guide part included in the opening and closing member, and supporting the first elastic member.

12. The water discharge device of claim 10, wherein the rotary member is rotatably provided between the operating part body and the operating part lid.

13. The water discharge device of claim 12, wherein a first magnet is provided in the rotary member, and a second magnet is provided in a position of the operating part cover corresponding to a position of the first magnet at a rotation position of the rotary member at which the opening and closing member opens the opening and closing hole.

14. The water discharge device of claim 12, wherein the operating part body has a first coupling part and the operating part lid has a second coupling part to which the first coupling part is coupled.

15. The water discharge device of claim 14, wherein the rotary member has a coupling part passing hole through which the first coupling part or the second coupling part passes.

16. The water discharge device of claim 15, wherein a second elastic member is connected to the rotary member, and the second elastic member is connected to the first coupling part or the second coupling part through the coupling part passing hole.

17. The water discharge device of claim 2, wherein the insertion part has a guide recess guiding movement of the guide protrusion.

* * * * *